United States Patent
Cummins

(10) Patent No.: US 6,289,410 B1
(45) Date of Patent: Sep. 11, 2001

(54) METHOD AND SYSTEM FOR MAINTAINING CONSISTENCY OF SHARED OBJECTS BASED UPON INSTANCE VARIABLE LOCKING

(75) Inventor: Fred A. Cummins, Farmington Hills, MI (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 08/683,294

(22) Filed: Jul. 18, 1996

(51) Int. Cl.$^7$ ............................ G06F 12/00; G06F 12/14; G06F 12/16
(52) U.S. Cl. .................... 710/200; 711/150; 711/152; 711/163
(58) Field of Search ..................... 395/726, 600, 395/153, 800; 364/200; 710/200; 712/1; 707/10, 104, 200, 201, 202, 203, 204, 205, 206; 711/150, 152, 163, 147, 148, 149

(56) References Cited

U.S. PATENT DOCUMENTS

| | | | |
|---|---|---|---|
| 5,187,786 | * 2/1993 | Densmore et al. | 395/600 |
| 5,261,069 | * 11/1993 | Wilkinson et al. | 711/144 |
| 5,263,155 | * 11/1993 | Wang | 395/600 |
| 5,301,337 | * 4/1994 | Wells et al. | 712/1 |
| 5,339,427 | * 8/1994 | Elko et al. | 395/725 |
| 5,353,425 | * 10/1994 | Malamy et al. | 711/144 |
| 5,388,196 | * 2/1995 | Pajak et al. | 395/153 |
| 5,410,697 | * 4/1995 | Baird et al. | 395/650 |
| 5,471,629 | * 11/1995 | Risch | 395/800 |
| 5,524,247 | * 6/1996 | Mizuno | 395/726 |
| 5,526,524 | * 6/1996 | Madduri | 395/726 |
| 5,586,331 | * 12/1996 | Levenstein | 395/726 |
| 5,592,673 | * 1/1997 | Kurabayashi et al. | 395/726 |
| 5,615,374 | * 3/1997 | Sadoi et al. | 395/726 |
| 5,623,671 | * 4/1997 | Ando et al. | 395/726 |
| 5,701,470 | * 12/1997 | Joy et al. | 395/614 |
| 5,761,670 | * 6/1998 | Joy et al. | 707/103 |
| 5,878,411 | * 3/1999 | Burroughs et al. | 707/4 |
| 5,893,106 | * 6/1999 | Brobst et al. | 707/102 |
| 5,940,827 | * 8/1999 | Hapner et al. | 707/8 |
| 5,995,998 | * 11/1999 | Furlani et al. | 709/102 |
| 6,041,312 | * 3/2000 | Bickerton et al. | 705/30 |

OTHER PUBLICATIONS

"Concurrency Control and Recovery in Database Systems" by P. A. Bernstein, V. Hadzilacos and N. Goodman, Addison–Wesley Publishing Co., 1987, pp. 1–105, plus cover, preface and table of contents.

"Implementing Constraint Imperative Programming Languages:The Kaleidoscope '93 Virtual Machine" by G.Lopez & A.Borning (Univ of Wash.), & B.Freeman–Benson (Carleton Univ), 10/94, pp. 259–271.

"Using Prototypical Objects to Implement Shared Behavior in Object Oriented Systems", by Henry Lieberman, Artificial Intelligence Laboratory, Massachusetts Institute of Technology, Cambridge, Massachusetts, Sep. 1986, pp. 214–223.

DECthreats Guide to DECthreats by Digital Equipment Corporation, Nov. 1991.*

* cited by examiner

Primary Examiner—Robert Beausoleil
Assistant Examiner—Tim Vo
(74) Attorney, Agent, or Firm—Baker Botts LLP

(57) ABSTRACT

The invention comprises a method and system for maintaining the integrity of shared objects based upon instance variable locking. In accordance with the method of the invention, a locking tag is attached to an instance variable, indicating that the instance variable was read by a first process. Reads of the instance variable by a second process are allowed while the first locking tag is present. A second locking tag is attached to the instance variable, indicating that the instance variable was read by the second process.

22 Claims, 2 Drawing Sheets

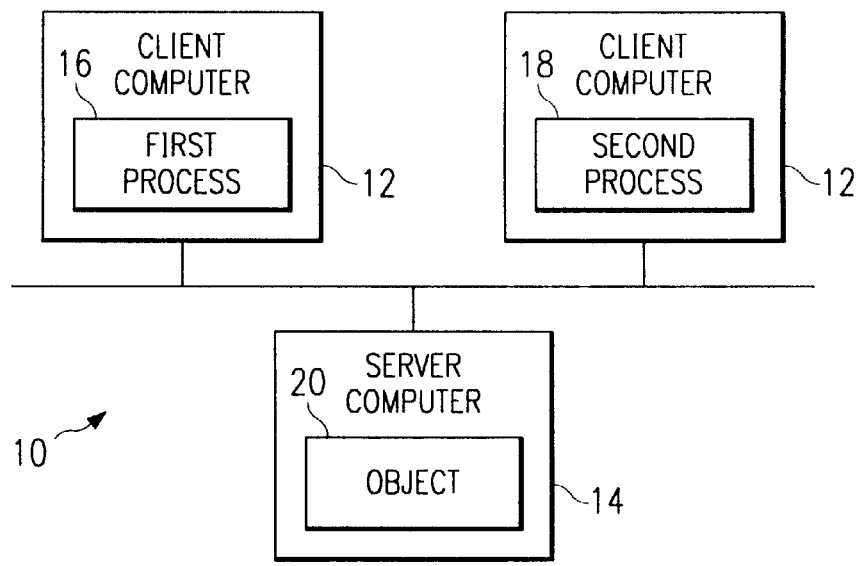
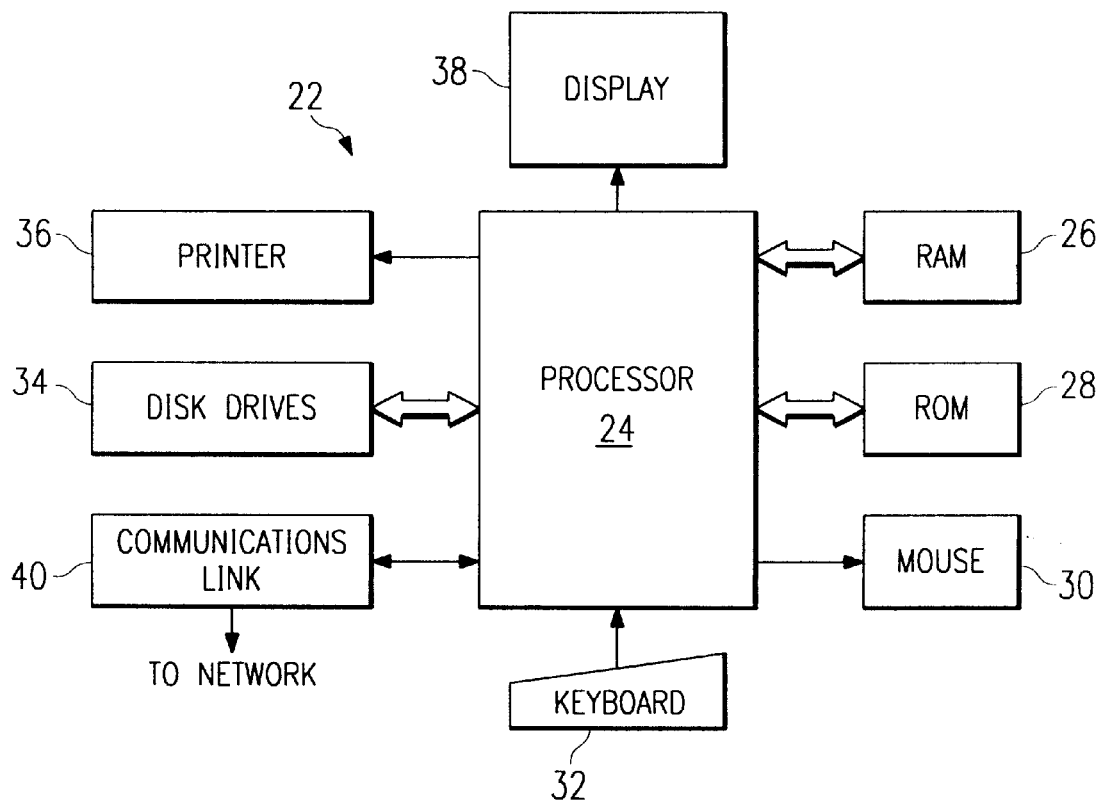

METHOD AND SYSTEM FOR MAINTAINING CONSISTENCY OF SHARED OBJECTS BASED UPON INSTANCE VARIABLE LOCKING

TECHNICAL FIELD OF THE INVENTION

This invention relates generally to object-oriented programming and more particularly, to a method and system for maintaining the integrity of shared objects using instance variable locking.

BACKGROUND OF THE INVENTION

Object-oriented programming is rapidly becoming the software industry's preferred method for developing software. Essentially, object orientation is a method of implementing components of a system and of constructing systems from these components.

"Objects" are software entities comprising data structures and associated operations. Objects can model concrete things or abstract ideas, in terms of characteristics or in terms of behavior. A software "object" is a group of elements working together or in succession to perform specific tasks. These elements are data elements, also called instance variables, and functions, also called methods, of the object. Objects are defined by creating "classes," which act as templates that instruct a computer how to construct an actual object. For example, a class may specify the number and type of instance variables and the steps involved in methods that define the actions of the object. An object created from a certain class is called an "instance" of that class. The class defines the operations and information initially in an instance, while the current state of the instance is defined by operations subsequently performed upon its instance variables by its methods.

The state of an object is represented by the values of its instance variables. The state can be retrieved or updated with accessor methods. Other methods will perform operations associated with an object and may invoke additional methods on the same or other objects.

A basic feature of object-oriented programming is encapsulation of objects. "Encapsulation" means that objects hide (encapsulate) their internal structure and the algorithms that implement their actions. Instead of exposing these implementation details, objects present interfaces that represent their abstractions cleanly with no extraneous implementation information.

Because objects are encapsulated, interactions between objects occur by sending messages that invoke methods. Each object has a protocol, that is, it has a set of messages to which the object can respond. The messages are used to invoke the methods defined for the object. Typical messages are from one object to another object or from an object to itself, but an external source such as a user interface might also send messages to, or receive messages from, an object.

In properly encapsulated objects, instance variables are only accessed by methods specified for access to each instance variable. These methods are called accessor methods. Thus, an instance variable is only accessed directly by its get and put accessor methods.

Systems using object-oriented programming concepts are being developed in distributed computing environments. In these environments, active objects may be accessed by multiple users as they participate in multiple business applications. As these systems become larger, integrate more applications, and have more users, some individual objects will be the subject of frequent accesses by multiple, concurrent transactions.

As an object is updated, temporary inconsistencies may occur within a system. Locking is used to achieve exclusive use of various objects and to force an interleaving of transactions such that the results are the same as if the transactions occurred serially, one after another, rather than concurrently (serialization). Existing systems typically achieve this consistency by locking entire objects such that a competing transaction cannot access a locked object until the lock is removed, either by a commit or by a backout from the lock-holding transaction. If shared objects are used in many applications by many users, then this existing locking mechanism can significantly degrade the performance and throughput of the system.

SUMMARY OF THE INVENTION

The present invention is directed to applying a locking mechanism with deferred updates at the instance variable level rather than at the object level. The invention comprises a method and system for maintaining the integrity of shared objects. In accordance with the method of the invention, a first locking tag is attached to an instance variable, indicating that the instance variable was read by a first process. A read of the instance variable by a second process is allowed while the first locking tag is present. A second locking tag is attached to the instance variable, indicating that the second process has read the instance variable.

The invention has several important technical advantages. Because different applications may access the same objects but access different variables in those objects, the invention allows more efficient sharing of shared resources. Efficiency is achieved because a process only locks the portion of an object that it accesses or updates, rather than locking the entire object. Because some objects in modern objected-oriented systems are becoming larger and the number of users accessing those objects is increasing, the invention is an important step in the implementation of large-scale distributed object systems. The invention may avoid delays in systems that have long duration update transactions. Reducing delays in the system through the use of the invention will also increase the efficiency and productivity of users of the system as they can achieve greater access to shared resources.

BRIEF DESCRIPTION OF THE DRAWINGS

For a more complete understanding of the present invention and the advantages thereof, reference is now made to the following descriptions taken in conjunction with the accompanying drawings in which:

FIG. 1 illustrates an example of a computer network that may use instance variable locking in accordance with the teachings of the invention;

FIG. 2 illustrates a diagram of an exemplary general-purpose computer that may be used in the network of FIG. 1.

DETAILED DESCRIPTION OF THE INVENTION

Figure 3:
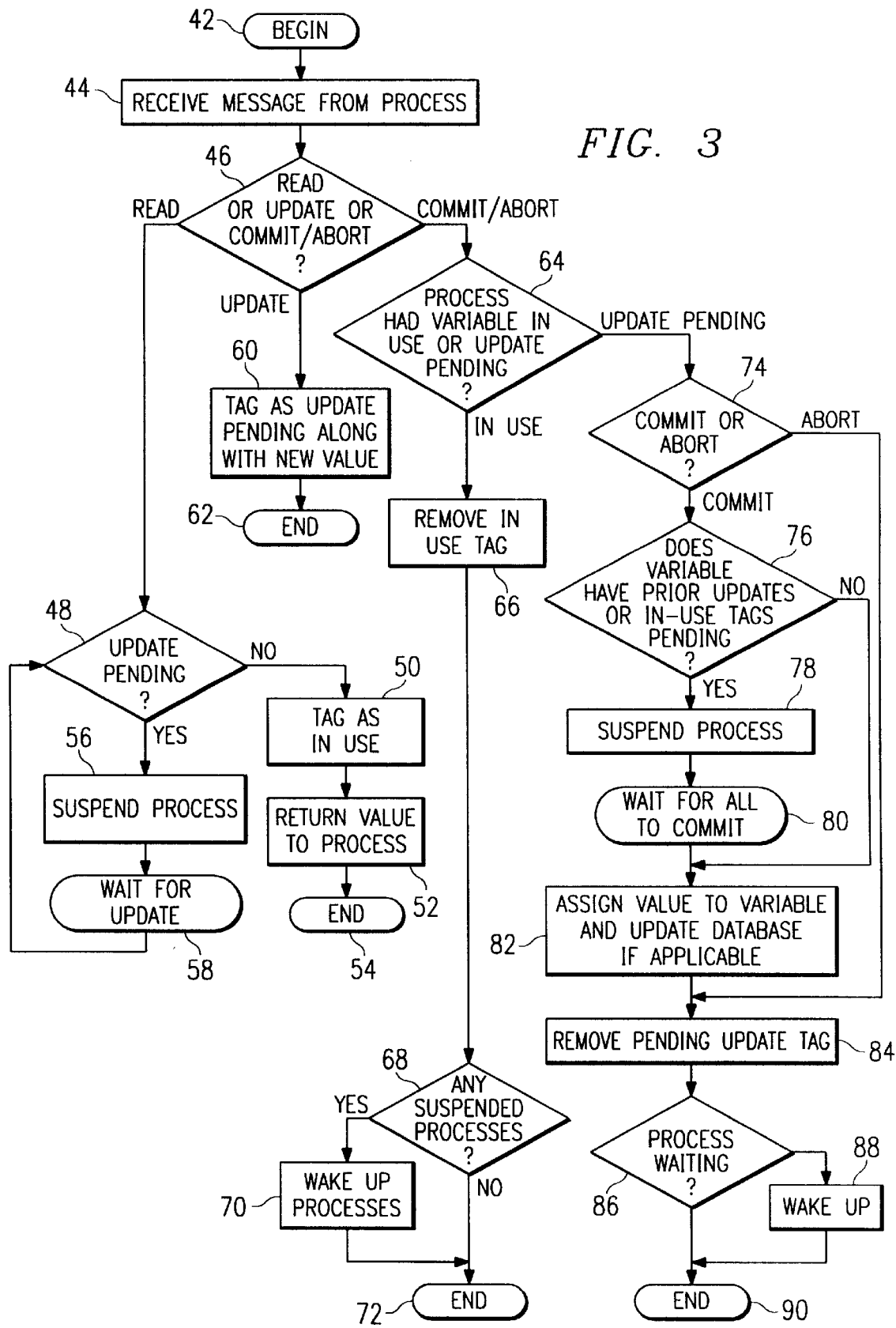
FIG. 3 illustrates a flow chart of a method for maintaining the integrity of instance variables in accordance with the teachings of the invention.

The preferred embodiment of the present invention and its advantages are best understood by referring to FIGS. 1–3 of the drawings, like numerals being used for like and corresponding parts of the various drawings.

FIG. 1 illustrates a computer network 10 that will be used to illustrate the operation of the invention. Although the invention is shown in operation in a client-server environment, the invention can be used in any environment that implements one or more objects that are shared among two or more applications or processes. Computer network 10 comprises one or more client computers 12 connected through a computer network to one or more server computers 14.

In this example, one client computer 12 is running a first process 16 that may access object 20. A second process 18 is running on another client computer 12 and may also access object 20. Because first process 16 and second process 18 may access object 20 simultaneously, the invention is used to maintain the integrity of object 20.

In accordance with the invention, locking of shared resources occurs at the instance variable level. A change to the value of an instance variable is not applied until the process causing the change has completed (commits). In this embodiment, a process that has obtained an instance variable value or is updating an instance variable value should commit before another transaction that changes the value of a shared instance variable can commit. By deferring updates of instance variable values, an object can be written to a database when a transaction commits because only the committed changes have actually been applied to the object.

Processes that obtain only the value of an instance variable without updating it may proceed while an update is pending because they are operating on a consistent state of the system that exists before application of the changes caused by the process that will update the instance variable. If a transaction with a pending update accesses the same variable again, then that transaction operates on the pending update value rather than the original value of the instance variable to maintain consistency within the individual transaction.

In this specific example, a tag is attached to each instance variable accessed by a process. If an instance variable is tagged as read (i.e., it is only being read by a process), then it can be read by other processes as well but it cannot be changed until the processes with read locking tags have committed. A separate read tag is attached by each process that reads an instance variable. If another process attempts to change an instance variable after the instance variable has been read by a pending process, then the process attempting to change the read variable may be suspended if it tries to commit before the read locking tag has been removed.

When an instance variable is tagged as changed in this embodiment, any process requesting to commit a subsequent update to the instance variable will be suspended until the process that is changing the variable has committed. Alternatively, additional read-only references by a process could be allowed even when an instance variable has been tagged as changed, depending upon the nature of the objects and processes. The latter method may be preferably used when transactions that update instance variables are long running processes. The additional processes seeking to read the instance variable would use the pre-update value that is still available until the updating process commits. When a process commits, all of its tags are removed from the instance variables that it accessed and suspended processes are allowed to proceed.

The invention may cause deadlocks to occur in one or more processes seeking concurrent access to a particular instance variable. To detect deadlocks, tags are examined to determine if a process that has been suspended is waiting for a process that is already waiting on it. When a deadlock occurs, one of the processes should be backed out in order to allow the other process to proceed. Here, backout is accomplished by simply removing the tags.

Instance variables are not updated in this embodiment until a process that causes the update has committed. When a process commits, the instance variables that that process has accessed are consistent with one another but the pending update values of other instance variables on the same objects may not be consistent. The state of the system is also inconsistent on the same basis. If the database were updated with these inconsistent values before processes committed, then the database would be inconsistent and the system might not be able to be recovered in the event of a failure. In other words, the serializability of the system would be problematic if instance variables were updated before processes sharing those variables had committed.

Accordingly, instance variables are not updated until the process causing the update has committed. When a change is logically applied by a process, the new assigned value is held along with the locking tag that indicates an update is pending. If the object containing the locked instance variable is written to the database by another process, the existing value is written rather than the pending assigned value. If the same process that intends to update the object references the locked instance variable again, the pending assigned value is returned. If other processes attempt to access the instance variable, the other processes may either be suspended or the existing, pre-update value may be returned to them as discussed above. When the process updating an instance variable commits, the actual instance variable is updated and all of the objects changed by the process may be written to a database. However, any pending values for other instance variables on those objects should not be written until the processes responsible for those pending values commit. Thus, the invention allows updates of a database to be consistent with committed processes without inconsistencies that might be introduced by uncommitted processes.

Instance variables are encapsulated such that they are accessed through their defined accessor methods. This aspect of the invention ensures that locks are appropriately attached and observed whenever the instance variable is accessed. In this embodiment, locks are managed by each object for each instance variable. However, locks could be managed by a lock manager that controls locks for many objects and/or system resources or a lock manager could manage all of the instance variables for each object.

The invention also allows efficient recovery from an abort by a process. When a process aborts, any lock tag indicating either an update or a reference by the process is removed and the instance variable value simply remains in its prior state. Thus, backout processing is minimized.

FIG. 1 will now be used to illustrate a few examples of the operation of the invention. Suppose that first process 16 has obtained the value of an instance variable of object 20 but has not yet committed. A locking tag indicating that first process 16 has read the instance variable will be attached to that instance variable. If second process 18 then desires to update the same instance variable, second process 18 will attach an update locking tag to the instance variable along with the new value for the instance variable. If second process 18 tries to commit, it will be suspended until first process 16 commits because first process 16 is acting on the basis of the current value of the instance variable. When first process 16 commits, the read locking tag is dropped and second process 18 is resumed (awakened). Second process 18 may then commit and the pending update to the instance variable may take place.

As another example, first process 16 and second process 18 may both desire to update an instance variable of object 20. Suppose that first process 16 is the first process to request an update of the instance variable. Then, an update locking tag will be attached to the instance variable along with the value that first process 16 desires to assign to the instance variable. When second process 18 seeks to update the instance variable of object 20, it too will attach an update locking tag to the instance variable along with the value that second process 18 desires to assign to the instance variable. If second process 18 reaches completion and seeks to commit prior to a commit by first process 16, then second process 18 will be suspended until first process 16 has committed. When first process 16 commits, the instance variable is updated and the update locking tag is released. Then, second process 18 may commit, causing the instance variable to again be updated and the second locking tag removed. Note that if first process 16 is waiting for a read commit for second process 18 then there is a deadlock if second process 18 wishes to update an instance variable pending update for first process 16.

FIG. 2 illustrates a general purpose computer 22 that may be used for either client computer 12 and/or server computer 14 of FIG. 1. General purpose computer 22 may be used to execute applications that were written using an object-oriented language employing the method and system of the invention for maintaining the integrity of instance variables. General purpose computer 22 may be adapted to execute any of the well-known MSDOS, PCDOS, OS2, UNIX, MAC-OS, and WINDOWS operating systems or other operating systems. General purpose computer 22 comprises processor 24, random access memory (RAM) 26, read-only memory (ROM) 28, mouse 30, keyboard 32 and input/output devices, such as printer 36, disk drives 34, display 38, and communications link 40. The present invention includes programs that may be stored in RAM 26, ROM 28, or disk drives 34 and may be executed by processor 24. Communications link 40 is connected to computer network 10 but could be connected to a telephone line, an antenna, a gateway, or any other type of communications link. Disk drives 20 may include a variety of types of storage media such as, for example, floppy disk drives, hard disk drives, CD ROM drives, or magnetic tape drives. Although this embodiment employs a plurality of disk drives 34, a single disk drive 34 could be used without departing from the scope of the invention. FIG. 2 only provides one example of a computer that may be used with the invention. The invention could be used on computers other than general purpose computers as well as on general purpose computers without conventional operating systems.

FIG. 3 illustrates a flow chart of a method of maintaining the integrity of instance variables of a shared object in accordance with the present invention. The method begins in step 42 with the initialization of an object such as object 20. In step 44, a message is received from a process. In step 46, it is determined whether the message from the process indicates that the process desires to read an instance variable, update an instance variable, or that the process has either committed or aborted. If the process desires to read an instance variable, then it is determined in step 48 whether or not an update is pending. In this example, if no update is pending, then the requesting process is allowed access to the variable and the variable is tagged as in use by the requesting process in step 50. The term "in use" refers to an instance variable being read by a process but not currently being updated by the process. Thus, tagging an instance variable as in use is equivalent to attaching a read locking tag to the variable. Continuing in step 52, the value of the instance variable is returned to the process and the procedure ends in step 54.

Returning to step 48, if an update was pending for the instance variable that the process desires to access, then the process is suspended in step 56. Alternatively, however, as discussed above, rather than suspending the requested process, steps 50 and 52 could be executed even if an update was pending and the process with the pending update would then wait for all processes currently having a read locking tag attached to the instance variable to commit before performing the update. In this example, however, the process is suspended in step 56 and the procedure waits for an update in step 58. When the update occurs, the processor requesting the read is restarted and the procedure continues in step 48.

Returning to step 46, if the process desired to update an instance variable, then the process continues in step 60. In step 60, the instance variable that the process desires to update is tagged with an update pending locking tag. The new value that the process desires to attach to the instance variable is also stored along with the locking tag. This value will be returned to the process requesting the update if the process seeks to read this instance variable again. If the instance variable is already in use or another update is pending, then, in this example, the process requesting the new update will not be allowed to commit until the other processes using or updating the instance variable have committed. The procedure then ends in step 62.

Returning to step 46, if a procedure desires to either commit or abort, then it is determined in step 64 whether the process had the instance variable in question either tagged as in use or tagged as update pending. If the instance variable was tagged as in use, then the in use tag is removed in step 66. In step 68, it is determined whether there are any suspended processes waiting for the process that committed or aborted to terminate. If so, then those processes are awakened in step 70. Otherwise, the process ends in step 72. When processes are awakened in step 70, their status is reevaluated in sequence using similar logic as if they were new requests. The suspended processes may include processes with read requests, update requests, and update commit requests depending upon the locking rules being applied. Processes should be allowed to proceed if they meet the conditions of the above described rules.

Returning to step 64, if an update was pending when a process desired to commit or to abort, it is determined in step 74 whether the process desires to commit or abort. If the process desires to abort, then the pending update tag is removed in step 84. In step 86, it is determined whether any processes are suspended. If a process is waiting for this process to terminate, then the waiting process is awakened in step 88. Otherwise, the procedure ends in step 90. When processes are awakened in step 88, their status is reevaluated in sequence using similar logic as if they were new requests. The suspended processes may include processes with read requests, update requests, and update commit requests depending upon the locking rules being applied. Processes should be allowed to proceed if they meet the conditions of the above described rules.

Returning to step 74, if a process has an update pending and that process attempts to commit, then it is determined in step 76 whether the instance variable has prior update tags or any in use tags attached. If the instance variable has prior update locking tags or has any in use locking tags attached to it, then in step 78, the process attempting to commit is suspended and the process waits in step 80 for processes with prior update tags and in use tags attached to the instance variable to commit. After that occurs, then the procedure continues in step 82. If, in step 76, there were no prior pending update tags or in use tags attached to the instance variable, then the procedure also continues in step 82.

In step 82, the pending update value is assigned to the instance variable and the object is updated. If the object is associated with a database, the object may also be written to a database at this time so as to update the database. Then, in step 84, the pending update tag is removed from the instance variable. In step 86, it is determined whether there are any other processes waiting for the committing process to commit. If so, then those processes are awakened in step 88. If not, then the process terminates in step 90. The awakened processes are treated as discussed above.

The discussion above has presented several types of locking rules. These locking rules could be fixed for an entire system or could be defined as dependent upon the transaction, the object, or even the instance variable. Where distinct performance advantages may be obtained from making the locking rules context dependent, the additional complexity of the system may be worthwhile.

Although the present invention has been described in detail, it should be understood that various changes, substitutions, and alterations can be made hereto without departing from the spirit and scope of the invention as defined by the appended claims.

What is claimed is:

1. A method of maintaining the integrity of shared objects in a computer, comprising:

attaching a first locking tag to an instance variable, the first locking tag indicating that the instance variable was read by a first process, wherein the instance variable comprises a part of a shared software object;

allowing a read of the instance variable by a second process while the first locking tag is present; and attaching a second locking tag to the instance variable, the second locking tag indicating that the instance variable was read by the second process.

2. The method of claim 1, further comprising:

suspending a committing third process that is attempting to change the instance variable, the third process suspended until the first and second locking tags have been removed.

3. The method of claim 1, further comprising:

removing the first locking tag when the first process either commits or aborts.

4. The method of claim 1, wherein the locking tag is controlled by the shared software object containing the instance variable.

5. The method of claim 2, further comprising:

attaching a third locking tag to the instance variable, the third locking tag indicating that the third process is attempting to update the instance variable.

6. The method of claim 5, wherein the third locking tag further comprises a new value for the instance variable.

7. The method of claim 5, further comprising:

removing the third locking tag if the third process aborts.

8. The method of claim 5, further comprising:

attaching a fourth locking tag to the instance variable, the fourth locking tag indicating that the instance variable was read by a fourth process; and wherein the third process is not committed until each of the first, second and fourth locking tags are removed.

9. The method of claim 5, further comprising:

suspending a fourth process that is attempting to read the instance variable, the fourth process suspended until each of the first, second and third locking tags have been removed.

10. The method of claim 6, further comprising:

updating the instance variable with the new value when the third process commits.

11. The method of claim 6, further comprising:

updating the new value in the third locking tag, the update performed by the third process and occurring before the third process commits.

12. A computerized system for maintaining the integrity of shared objects, comprising:

a computer-readable medium; and a computer program encoded on the computer-readable medium, the computer program operable to:

attach a first locking tag to an instance variable, the first locking tag indicating that the instance variable was read by a first process, wherein the instance variable comprises a part of a shared software object;

allow a read of the instance variable by a second process while the first locking tag is present; and attach a second locking tag to the instance variable, the second locking tag indicating that the instance variable was read by the second process.

13. The computerized system of claim 12 wherein the computer program is further operable to:

suspend a committing third process that is attempting to change the instance variable, the third process suspended until the first and second locking tags have been removed.

14. The computerized system of claim 13 wherein the computer program is further operable to:

attach a third locking tag to the instance variable, the third locking tag indicating that the third process is attempting to update the instance variable.

15. The computerized system of claim 14 wherein the computer program is further operable to:

remove the third locking tag if the third process aborts.

16. The computerized system of claim 14 wherein the computer program is further operable to:

attach a fourth locking tag to the instance variable, the fourth locking tag indicating that the instance variable was read by a fourth process; and wherein the third process is not committed until each of the first, second and fourth locking tags are removed.

17. The computerized system of claim 14 wherein the computer program is further operable to:

suspend a fourth process that is attempting to read the instance variable, the fourth process suspended until each of the first, second and third locking tags have been removed.

18. The computerized system of claim 14 wherein the third locking tag further comprises a new value for the instance variable.

19. The computerized system of claim 18 wherein the computer program is further operable to:

update the instance variable with the new value when the third process commits.

20. The computerized system of claim 18 wherein the computer program is further operable to:

update the new value in the third locking tag, the update performed by the third process and occurring before the third process commits.

21. A method of maintaining the integrity of shared objects in a computer, comprising:

attaching a first locking tag to a first instance variable, the first locking tag indicating that the first instance variable was read by a first process, wherein the first instance variable comprises a part of a first shared software object; and attaching a second locking tag to a second instance variable, the second locking tag indicating that the second instance variable was read by a second process, wherein the second instance variable comprises a part of the first shared software object wherein the second instance variable was read by the second process while the first locking tag was present.

22. A computerized system for maintaining the integrity of shared objects, comprising:

a computer-readable medium; and a computer program encoded on the computer-readable medium, the computer program operable to:

attach a first locking tag to a first instance variable, the first locking tag indicating that the first instance variable was read by a first process, wherein the first instance variable comprises a part of a first shared software object; and attach a second locking tag to a second instance variable, the second locking tag indicating that the second instance variable was read by a second process, wherein the second instance variable comprises a part of the first shared software object wherein the second instance variable was read by the second process while the first locking tag was present.

\* \* \* \* \*